(12) United States Patent
Bugenhagen et al.

(10) Patent No.: US 8,340,083 B2
(45) Date of Patent: *Dec. 25, 2012

(54) BORDER CONTROL SYSTEM, METHOD, AND SOFTWARE

(75) Inventors: Michael K. Bugenhagen, Olathe, KS (US); Matthew C. Schlesener, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/578,684

(22) Filed: Oct. 14, 2009

(65) Prior Publication Data

US 2010/0046535 A1 Feb. 25, 2010

Related U.S. Application Data

(63) Continuation of application No. 10/900,569, filed on Jul. 28, 2004, now Pat. No. 7,626,979.

(51) Int. Cl.
*H04L 12/66* (2006.01)

(52) U.S. Cl. .................. 370/352; 340/286.02; 370/230; 370/254; 370/260; 370/316; 370/401; 455/432.1; 705/50; 709/222; 709/223

(58) Field of Classification Search ............. 340/286.02; 370/238, 254, 316, 352, 392, 401, 230, 260; 709/222, 223; 455/432.1; 705/50
See application file for complete search history.

(56) References Cited

U.S. PATENT DOCUMENTS

| | | | | |
|---|---|---|---|---|
| 6,259,691 B1 * | 7/2001 | Naudus | | 370/352 |
| 6,584,083 B1 * | 6/2003 | Toporek et al. | | 370/316 |
| 6,587,454 B1 * | 7/2003 | Lamb | | 370/352 |
| 6,934,745 B2 * | 8/2005 | Krautkremer | | 709/223 |
| 6,937,575 B1 * | 8/2005 | Galich et al. | | 370/254 |
| 6,959,281 B1 * | 10/2005 | Freeling et al. | | 705/50 |
| 7,038,574 B1 * | 5/2006 | Schlesener et al. | | 340/286.02 |
| 7,120,682 B1 * | 10/2006 | Salama | | 709/222 |
| 7,127,244 B2 * | 10/2006 | Chin | | 455/432.1 |
| 7,293,080 B1 * | 11/2007 | Clemm et al. | | 709/223 |
| 7,453,803 B1 * | 11/2008 | Bugenhagen | | 370/230 |
| 7,457,290 B1 * | 11/2008 | Salama et al. | | 370/392 |
| 7,460,493 B1 * | 12/2008 | Dhanoa et al. | | 370/260 |
| 7,626,979 B1 * | 12/2009 | Bugenhagen et al. | | 370/352 |
| 7,881,281 B1 * | 2/2011 | Bugenhagen et al. | | 370/352 |
| 2002/0101860 A1 * | 8/2002 | Thornton et al. | | 370/352 |
| 2003/0123436 A1 * | 7/2003 | Joseph et al. | | 370/352 |
| 2003/0202521 A1 * | 10/2003 | Havinis et al. | | 370/401 |
| 2006/0098577 A1 * | 5/2006 | MeLampy et al. | | 370/238 |
| 2007/0291733 A1 * | 12/2007 | Doran et al. | | 370/352 |
| 2010/0046535 A1 * | 2/2010 | Bugenhagen et al. | | 370/401 |

* cited by examiner

*Primary Examiner* — Gerald Gauthier

(57) ABSTRACT

Embodiments disclosed herein include systems, methods, and software that reduce processing burdens on host soft switches. A method of operating a communication network comprises receiving a plurality of update messages from a plurality of border controllers that interface communications between a first packet network and a second packet network. The update messages are processed to determine operational states of the plurality of border controllers. Responsive to receiving a query from a soft switch in the first packet network for a session between the first and second packet networks, the query is processed to select a first border controller for the session from the plurality of border controllers based on the operational states of the plurality of border controllers. A response is transferred to the soft switch indicating the first border controller.

14 Claims, 10 Drawing Sheets

FIG. 7

| BC | Net #1 | Net #2 | Status |
|---|---|---|---|
| 531 | 510 | 520 | 1 |
| 532 | 510 | 520 | 0 |
| 533 | 510 | 520 | 1 |
| 581 | 510 | 580 | 1 |
| 582 | 510 | 580 | 1 |
| 583 | 510 | 580 | 0 |

~710

BORDER CONTROL SYSTEM, METHOD, AND SOFTWARE

RELATED APPLICATIONS

This application is a continuation of and claims priority to U.S. patent application Ser. No. 10/900,569, entitled PACKET VOICE NETWORK BORDER CONTROL, filed on Jul. 28, 2004, which is hereby incorporated by reference in its entirety.

FEDERALLY SPONSORED RESEARCH OR DEVELOPMENT

Not applicable

MICROFICHE APPENDIX

Not applicable

BACKGROUND

1. Technical Field

The invention is related to controlling borders between packet based networks, and in particular, to border control systems and methods.

2. Description of the Prior Art

Current Voice over Internet Protocol (VoIP) networks route voice communications using the IP format. Essentially, voice communications are converted into packets and transported through IP networks. In an example of a typical VoIP call from an on-net subscriber to an off-net destination, the subscriber to the VoIP network utilizes a phone program on a personal computer connected to the Internet. An application on the computer converts voice communications to packets and transmits the voice packets to the Internet. The packets are then routed to a gateway on a standard switched telephone network such as the public switched telephone network (PSTN). The voice packets are then routed through the PSTN to the destination for the call.

In an example of a typical VoIP call from an on-net subscriber to another on-net subscriber, both users utilize phone programs on their personal computers connected to the Internet. In this case, voice communications are converted to packets and transmitted over the Internet in accordance with routing instructions in the packet headers. The packets are routed in the same fashion as any other type of packet, such as a packet carrying email.

Problematically, VoIP calls suffer from low quality of surface and reliability. In both examples of the prior art, VoIP calls are either dumped to the nearest gateway and then routed on the PSTN, or the calls are routed over the Internet and suffer from low quality. In either case, intelligent routing decisions are not made to choose an optimal route, gateway, or otherwise.

One solution in the prior art to solve the persistent problems of low quality and reliability involves implementing dedicated VoIP networks. Unfortunately, stand alone dedicated VoIP networks are only able to provide high quality of service for a call between two subscribers to the dedicated VoIP service. If a call must reach the PSTN, dedicated VoIP networks do not possess intelligent gateway selection capabilities. Additionally, for a call that must transit between two competitive dedicated VoIP networks, intelligent border control capabilities do not exist.

Packet voice networks, such as VoIP networks, utilize border controllers to control traffic exchanged across various packet networks. Often times, numerous border controllers are employed between two packet networks. A typical border controller may consist of a firewall and an application server, for example. Packet switches typically perform call setup processing for calls across two packet networks, including choosing the particular border controller for a call.

For calls originating from a host packet network and destined for another competitive packet voice network, the host packet switch is responsible for choosing the border controller for the call. The host packet switch is also responsible for querying a corresponding packet switch in the destination packet network for the network address of the called party. The host packet switch is further responsible for alerting the destination switch of the identity of the chosen border controller. The host packet switch also notifies the calling device of the chosen border controller.

Problematically, requiring a host switch to interface with the destination switch inefficiently places processing burdens on the host switch that could be better directed towards other purposes. Requiring a host switch to choose a border controller also inefficiently burdens the switch. Furthermore, requiring host switches to communicate with several border controllers potentially opens security holes to the packet network of the host switch. Requiring the host switch to notify the destination switch of the chosen border controller creates additional potential security holes into the host packet network. Thus, improved operations between competitive networks is desired.

OVERVIEW

Embodiments disclosed herein solve the above problems as well as other problems by providing systems, methods, and software that reduce processing burdens on host soft switches. Some embodiments may also remove potential security holes in packet based voice networks.

In one embodiment, a method of operating a communication network comprises receiving a plurality of update messages from a plurality of border controllers that interface communications between a first packet network and a second packet network. The update messages are processed to determine operational states of the plurality of border controllers. Responsive to receiving a query from a soft switch in the first packet network for a session between the first and second packet networks, the query is processed to select a first border controller for the session from the plurality of border controllers based on the operational states of the plurality of border controllers. A response is transferred to the soft switch indicating the first border controller.

BRIEF DESCRIPTION OF THE DRAWINGS

The same reference number represents the same element on all drawings.

FIG. 7 illustrates a routing table in an embodiment.

DETAILED DESCRIPTION

FIGS. 3-10 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

PRIOR ART EXAMPLE—FIGS. 1-2

Figure 1:
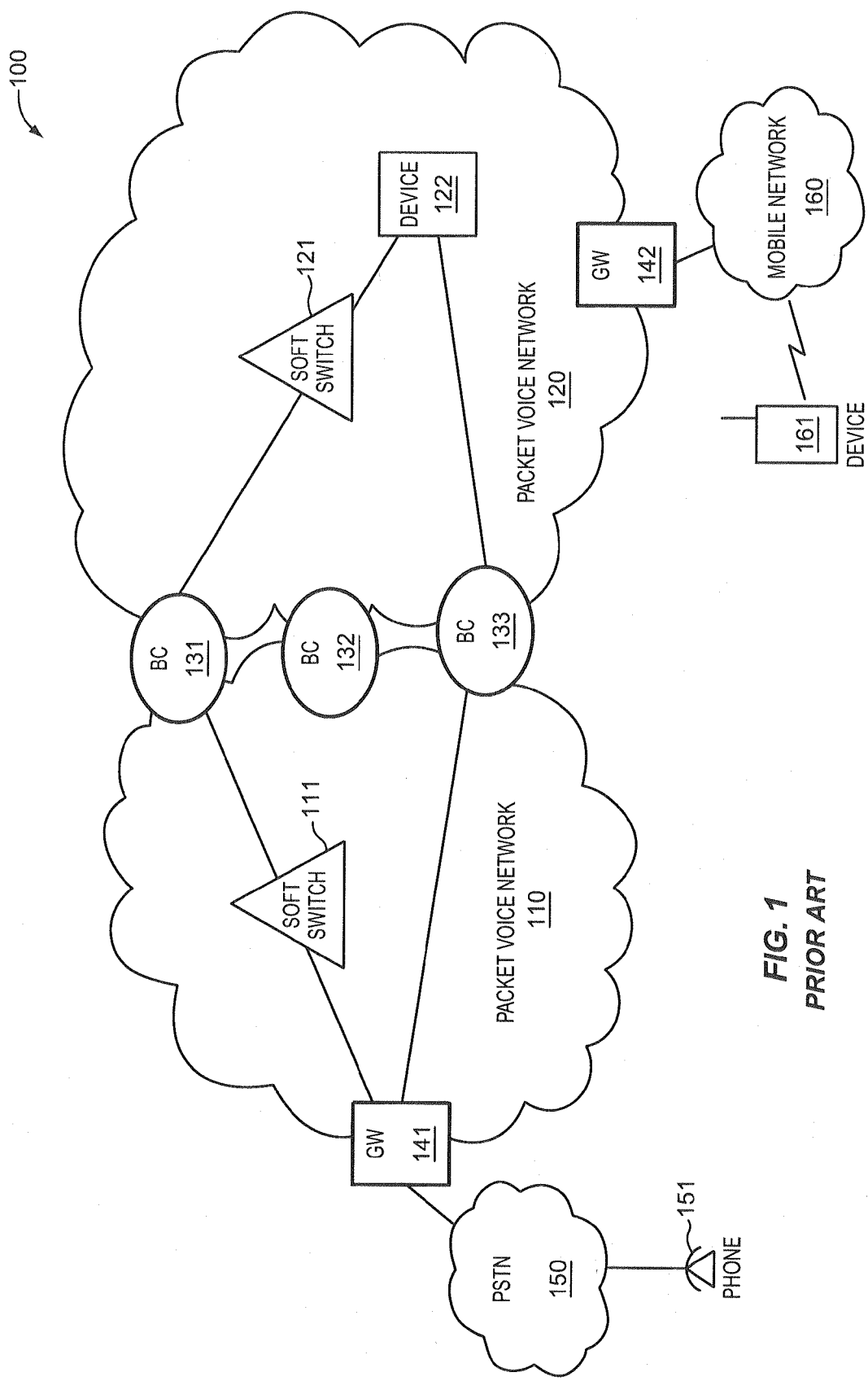
FIG. 1 illustrates a communication network in an example of the prior art.

FIG. 1 illustrates communication network 100 in an example of the prior art. Communication network 100 includes packet voice network 110 and packet voice network 120. Packet voice networks 110 and 120 are competitive networks. Network 110 includes packet switch 111. Packet network 120 includes packet switch 121 and mobile device 122. Border controllers 131, 132, and 133 couple packet network 110 to packet network 120. Gateway 131 couples public switched telephone network (PSTN) 150 to packet network 110. Similarly, gateway 142 couples mobile network 160 to packet network 120. Device 151 is coupled to PSTN 150, and device 161 is coupled to mobile network 160.

Figure 2:
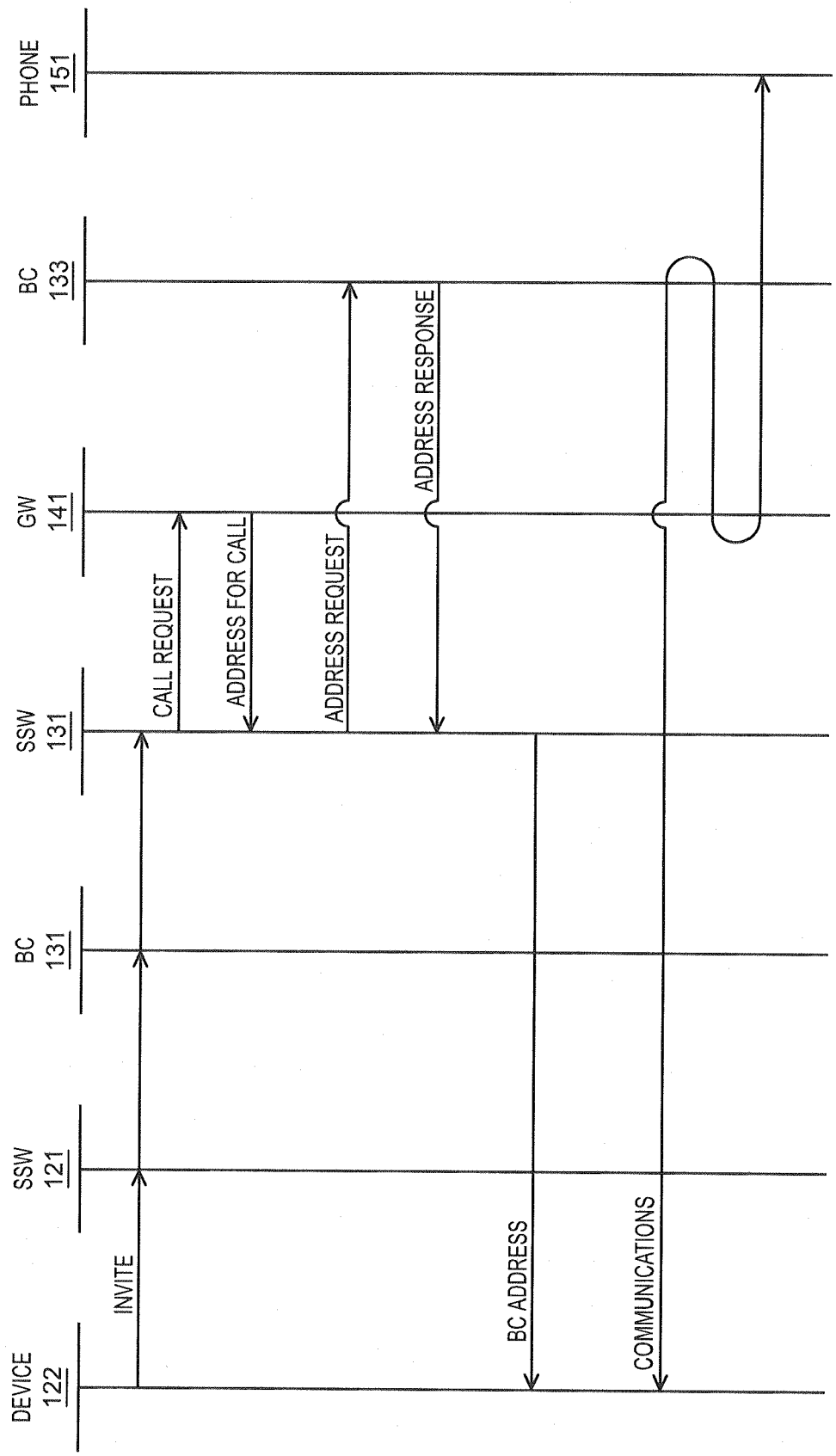
FIG. 2 illustrates the operation of a communication network in an example of the prior art.

FIG. 2 illustrates the operation of communication network 100 in an example of the prior art. In this example, mobile device 122 is a Session Initiation Protocol (SIP) enabled device. SIP is a packet based signaling protocol for packet voice networks well known to those in the art. Switch 121 is commonly referred to in the art as a packet switch, soft switch, or media gateway controller. Switch 121 is SIP and telephony routing over Internet protocol (TRIP) enabled. TRIP is a well known protocol for messaging between soft switches and media gateways. Switch 111 is also TRIP and SIP enabled. Gateway 141 is TRIP-lite enabled. TRIP-lite is a scaled down version of TRIP that resides on gateways for communication between gateways and media gateway controllers such as switches 111 and 121. Further in this example, communication device 151 is a telephone connected to PSTN 150.

Referring again to FIG. 2, device 122 initiates a call to device 151 by first transmitting a SIP invite message for the call to switch 121. The invite message includes the phone number for device 151 and identifies the user of device 122 in the format user@domain.name. The phone number is of the format xxx-xxx-xxxx, wherein the first three digits indicate the area code for device 151. Switch 121 accesses a TRIP routing table to determine the best gateway to reach PSTN 150 for the call. Upon determining that gateway 141 is the best gateway, switch 121 next forwards the SIP invite message to switch 111. The forwarded SIP invite message indicates the phone number for device 151 as well as the network address of device 122.

Upon receiving the forwarded SIP invite message, switch 111 processes the phone number to pick a gateway for the call. In this example, only a single gateway to PSTN 150 is shown, although it is understood that several gateways could interface between packet network 110 and PSTN 150. Switch 111 transmits a call request to gateway 141 including the phone number for device 151. Gateway 141 transmits a call response to switch 111 indicating a network address for a port on gateway 141 to be used for the call. Any communications that reach gateway 141 at the selected port are interworked for PSTN 150, and in turn to device 151.

After receiving the network address for gateway 141 to be used for the call, switch 111 picks a border controller of border controllers 131, 132, and 133 for the call. Assuming switch 111 picks border controller 133, switch 111 then transmits a message to gateway 141 indicating the network address for border controller 133. Additionally, switch 111 informs border controller 133 of the network address of gateway 141 for the call. Switch 111 also informs border controller 133 of the network address for device 122. Lastly, switch 111 informs device 122 of the appropriate network address for border controller 133.

For communications heading in the direction from device 151 to device 122, gateway 141 addresses the communications to border controller 133. Border controller 133 addresses any communications received from the network address of gateway 141 for the call to device 122. For communications heading in the direction from device 122 to device 141, border controller addresses the communications to gateway 141 using the network address of gateway 141 for the call. Gateway 141 interworks any communications addressed for its network address to PSTN 150, and in turn, to device 151.

The above discussion of the prior art illustrates several problems in the prior art. Requiring soft switch 111 to choose a border controller inefficiently burdens switch 111. Furthermore, requiring host switch 111 to communicate with the several border controllers 131, 132, and 133 potentially opens security holes to the host switch. Requiring host switch 111 to notify destination switch 121 of the chosen border controller creates additional potential security holes into the host packet network.

In another problem with the prior art, switch 111 does not have knowledge of the operations and state of packet network 120 because networks 110 and 110 are owned and operated by competitive entities. Presently, switch 111 determines the route through the various network elements of packet network 110 that carry bearer traffic. Switch 111 holds status information related to the various network elements of packet network 110 and can thereby determine the best possible route through packet network 110 for a call. However, switch 111 does not possess any knowledge or capabilities with respect to the various network elements of packet network 120. Thus, when choosing which border controller of border controllers 131, 132, and 133 to use, switch 111 is not aware of which border controller is connected to the optimal route for the call through packet network 120.

In another problem with the prior art, the operational state of border controllers 131, 132, and 133 is not monitored by switch 111 or switch 121. When choosing the border controller, switch 111 is not able to choose the optimal border controller based on the operational state of the border controllers. For instance, switch 111 is not aware of whether or not any border controller is in congestion. Because switch 111 does not know the operational state of border controllers 131, 132, and 133, switch 111 is not able to load balance calls across the border controllers.

Figure 3:
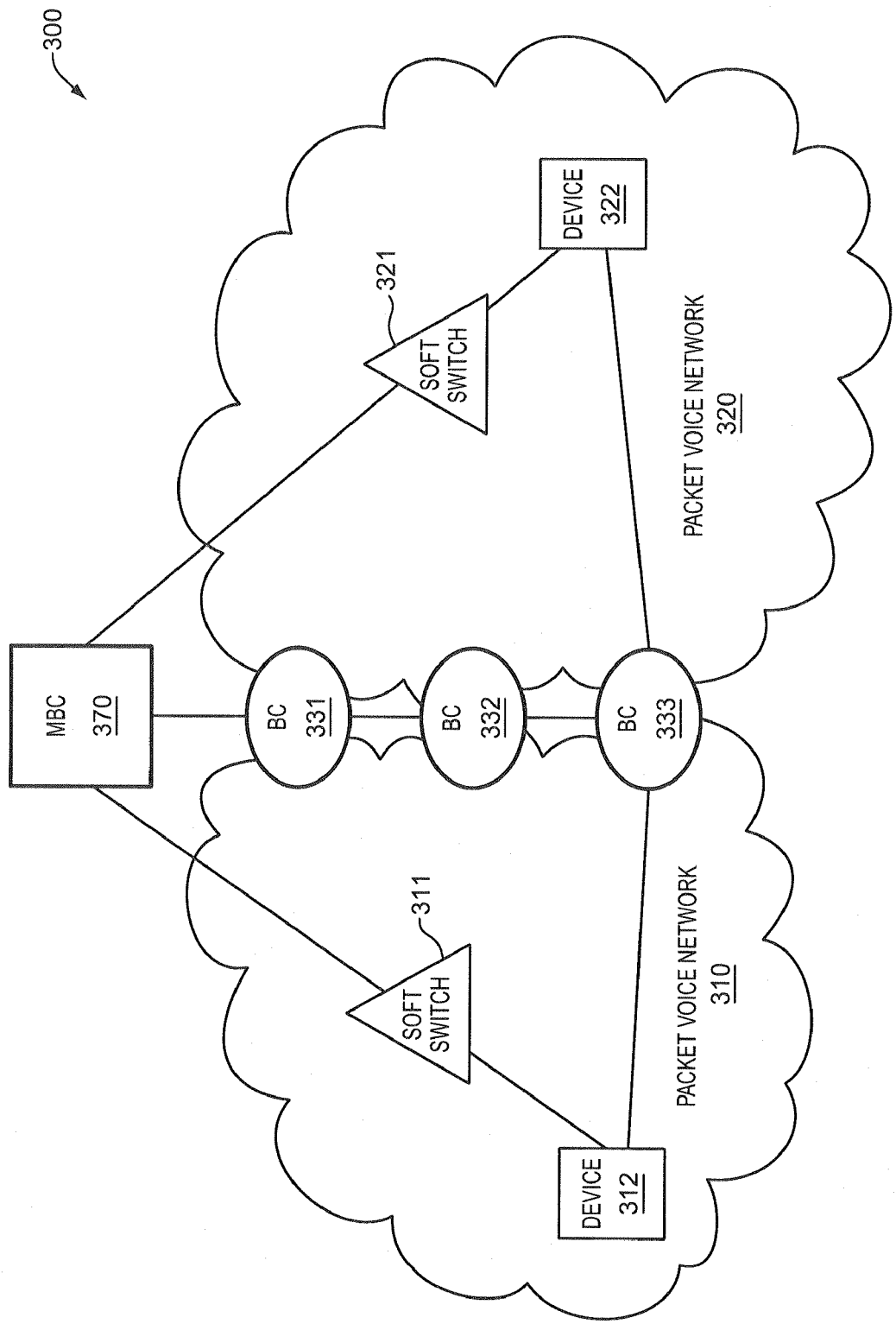
FIG. 3 illustrates a communication network in an embodiment.

FIG. 3 illustrates communication network 300 in an embodiment. Communication network 300 includes packet voice network 310 and packet voice network 320. Packet voice network 310 includes soft switch 331 and destination element 312. Packet voice network 320 includes soft switch 321 and origination element 322. Packet voice network 310 is coupled to PSTN 350 by gateway 341. Similarly, packet voice network 320 is coupled to mobile communication network 360 by gateway 342. Device 351 is coupled to PSTN 350, and device 361 is coupled to mobile communication network 360. Border controllers 331, 332, and 333 couple packet voice network 310 to packet voice network 320. Master border controller 370 is coupled to soft switches 311 and 321 and coupled to border controllers 331, 332, and 333.

Figure 4:
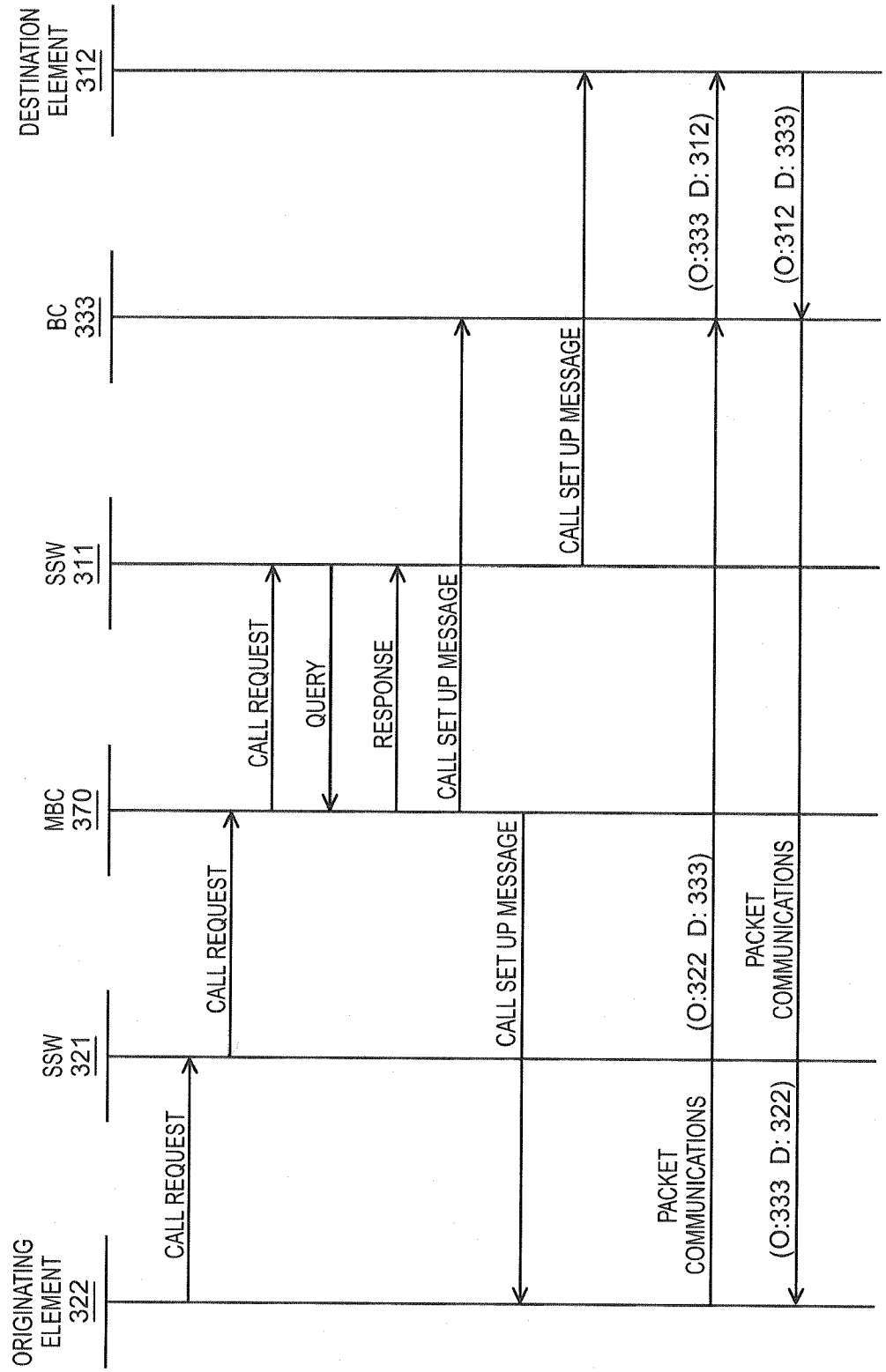
FIG. 4 illustrates the operation of a communication network in an embodiment.

FIG. 4 illustrates the operation of FIG. 3 in an embodiment. In particular, FIG. 4 illustrates a call setup sequence diagram for a call from origination element 322 to destination element 312. Origination element 322 could comprise a network node such as a mobile communication device, a gateway to another domain or network, a combination of several network elements, as well other types of network elements. Destination element 312 could comprise a network node such as a mobile communication device, a gateway to another domain, a combination of several network elements, as well other types of network elements. FIG. 3 depicts signaling channels between the various elements of communication network 300. It is understood that bearer channels exist between the various elements of communication network 300, but are not shown for purposes of clarity.

To begin, border controllers 331, 332, and 333 continuously transmit update messages to master border controller 370. The update messages indicate the operational states of border controllers 331, 332, and 333. For example, an update message from border controller 331 could indicate call data statistics such as the call volume or call attempts currently routed through border controller 331. Depending upon the nature of the update messages, master border controller 370 could take one of the border controllers out of service. For example, an update message from border controller 332 could indicate that the border controller is in a period of congestion. To lessen the congestion, border controller 370 could take border controller 332 out of service until the period of congestions is over. The update messages could be TRIP update messages.

Master border controller, upon receiving the update messages, processes the update messages to update a routing table. The routing table could be, for example, a TRIP routing table. The routing table stores the operational states of border controllers 331, 332, and 333. By knowing the operational states of the border controllers, master border controller 370 can load balance across the border controllers. Master border controller 370 can also inform switches 311 and 321 of the operational states of border controllers 331, 332, and 333. For example, master border controller 370 can flood switches 311 and 321 with update messages regarding the border controllers.

Referring to the call setup sequence diagram of FIG. 4, origination element 322 transmits a call request to switch 321. The call request indicates a proxy origination address for origination element 322 and a proxy destination address. Switch 321 receives and processes the call request. Switch 321 determines that the call is for a destination outside of packet voice network 320 and responsively transfers the call request to master border controller 370. The transferred call request indicates the proxy origination address for origination element 322 and the proxy destination address for destination element 312.

Master border controller receives the call request and processes the proxy destination address to determine which network is associated with the proxy destination address. In an embodiment, master border controller 370 is coupled to more than two networks. Therefore, master border controller 370 processes the proxy destination address to determine which of the networks is associated with the proxy destination address. Master border controller 370 also determines whether or not signaling protocol conversion is required. For example, two competing network may use different signaling protocols such as SIP, H.323, or SS7, as well as other signaling protocols. Master border controller 370 might receive the call request in the SIP protocol and convert it to H.323, as well as another signaling protocol.

Upon determining that packet voice network 310 is associated with the proxy destination address, master border controller 370 transfers the call request to switch 311. The transferred call request indicates the proxy destination address. The proxy destination address could comprise a user name and domain name in the form of user@domain.com, a phone number for a destination on the PSTN, as well as other types of addresses.

Switch 311 processes the call request in accordance with standard call processing well known to those in the art. For example, switch 311 processes the call request to determine if destination element 312 is available. Switch 311 also processes the call request for billing and operations management. Upon determining that the call can proceed, switch 311 transmits a query to master border controller 370 requesting a border controller for the call. Master border controller 370 processes the query to choose a border controller for the call. Master border controller 370 chooses the border controller based on several factors such as capacity, best route, cost, capabilities, as well as other factors. Master border controller 370 chooses the optimal border controller by accessing the routing table that was updated upon receiving update messages from border controllers 331, 332, and 333. The several factors such as capacity, best route, cost, and capabilities are examples of factors that determine the operational state of each border controller.

After determining that border controller 333 is the optimal choice for the call, master border controller 370 transfers a response to switch 311 indicating border controller 333. Switch 311 transmits a call setup message to destination element 312 indicating border controller 333. Master border controller 370 transmits a call setup message to switch 321 indicating border controller 333. Switch 321 passes the identity of border controller 333 to origination element 322. Master border controller 370 also transmits a call setup message to border controller 333 that identifies origination element 322 and destination element 312.

Communications for the call can commence after call setup is completed. Packets routed in the direction from origination element 322 to destination element 312 arrive at border controller 333 indicating origination element 312 as the source and border controller 333 as the destination. Border controller 333 then forwards the packets to destination element 312. These packets indicate border controller 333 as the source and destination element 312 as the destination. Packets routed in the direction from destination element 312 to origination element 322 arrive at border controller 333 indicating destination element 312 as the source and border controller 333 as the destination. Border controller 333 then forwards the packets to origination element 322. These packets indicate border controller 333 as the source and origination element 322 as the destination.

Advantageously, master border controller 370 determines the best border controller for the call, rather than burdening switch 311 with the responsibility of choosing the best border controller. Master border controller 370 also handles signaling protocol conversion rather than burdening the soft switches with conversion responsibilities. Additionally, master border controller 370 informs switch 321 of the chosen border controller which removes security liabilities present if switch 311 were to pick the border controller and transmit a call setup message to switch 321. Thus, both packet networks 310 and 320 can protect their networks from unauthorized access. Segregating network operations is desirable because packet networks 310 and 320 are competitive networks. Furthermore, master border controller 370 has distributed knowledge of both voice packet networks 310 and 320, thereby enabling master border controller 370 to choose the optimal border controller for the call. Master border controller 370 also has knowledge of the operational states of border controllers 331, 332, and 333, thereby enabling master border controller 370 to choose the optimal border controller.

Figure 5:
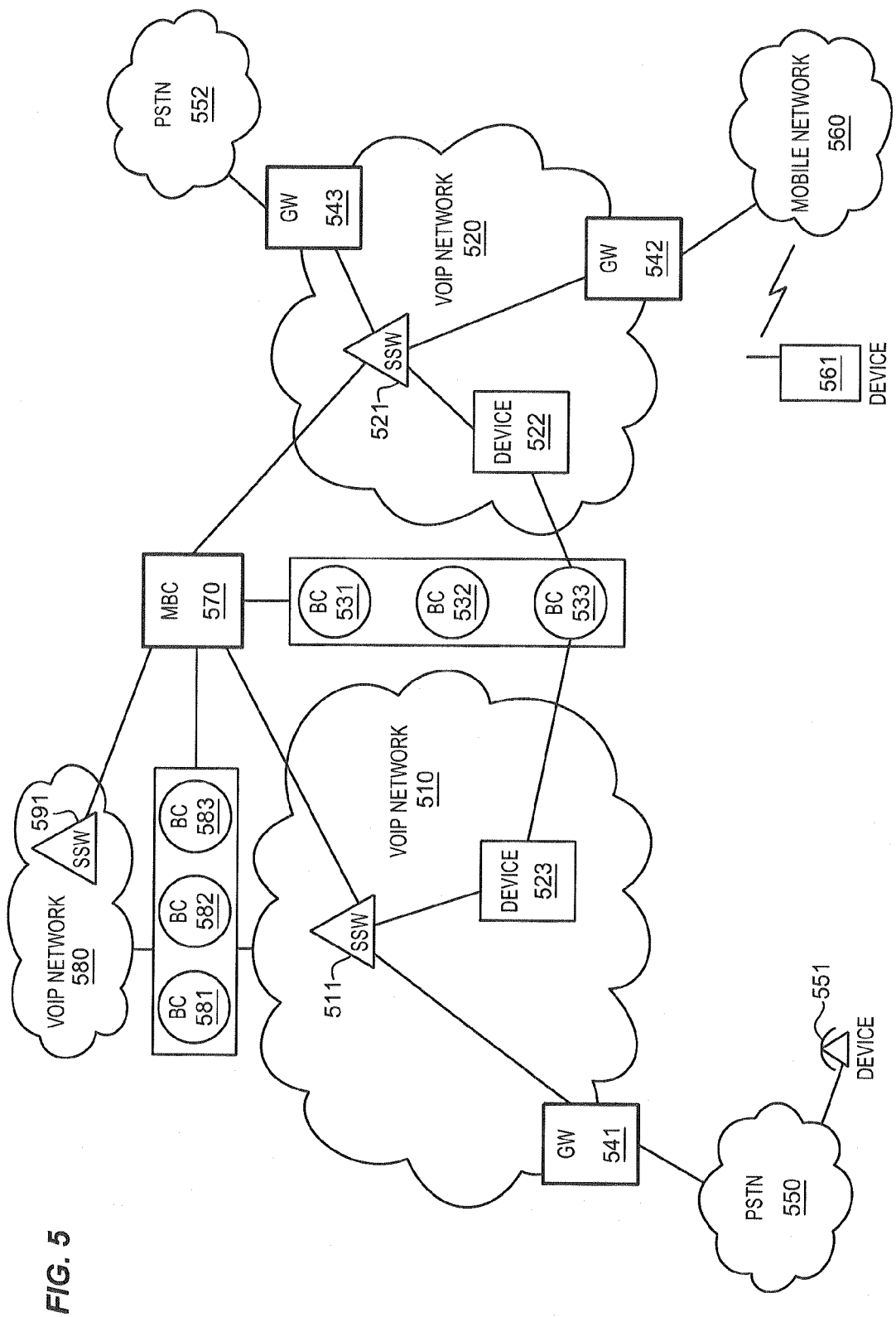
FIG. 5 illustrates a communication network in an embodiment.

FIG. 5 illustrates communication network 500 in an embodiment. FIG. 5 includes competitive VoIP networks 510, 520, and 580. Border controllers 531, 532, and 533 couple VoIP network 510 to VoIP network 520. Border controllers 581, 582, and 583 coupled VoIP networks 580 and 510. VoIP network 580 includes soft switch 591 which is in communication with master border controller 570. VoIP network 510 includes soft switch 511 and device 523. Soft switch 511 is in communication with master border controller 570. VoIP network 520 includes soft switch 521 and device 522. Soft switch 521 is in communication with master border controller 570. Gateway 541 couples VoIP network 510 with PSTN region 550. Device 551 is in communication through PSTN region 550. Gateway 542 couples VoIP network 520 with mobile communication network 560. Device 561 is in communication through mobile communication network 560. Gateway 543 couples VoIP network 520 with PSTN region 552.

Soft switches 511 and 521 are TRIP and SIP enabled. Similarly, devices 523 and 522 are SIP enabled devices. Gateways 541, 542, and 543 are TRIP-lite enabled gateways. TRIP-lite is a version of TRIP applicable to media gateways. Device 551 comprises a communication device such as a plain old telephone service (POTS) device. Device 561 comprises a wireless device such as a PDA, PCS phone, or other types of wireless devices. Border controllers 531, 532, and 533 are TRIP or TRIP-lite enabled border controllers. Master border controller 570 is a TRIP and SIP enabled master border controller.

It is assumed that the user of device 522 is a subscriber of the operating entity of VoIP network 522, and that the user of device 523 is a subscriber of the operating entity of VoIP network 510. The operating entity of VoIP network 520 could be the owner or part owner of VoIP network 520. The operating entity could also be a service provider that leases VoIP network 520, as well as having some other type of business relationship with VoIP network 510. The operating entity of VoIP network 510 could be the owner or part owner of VoIP network 510. The operating entity could also be a service provider that leases VoIP network 510, as well as having some other type of business relationship with VoIP network 510. The operating entities of VoIP network 510 and 520 are competitive entities against each other. For example, VoIP network 520 could be operated by Sprint Corporation, and VoIP network 510 by Verizon.

Figure 6:
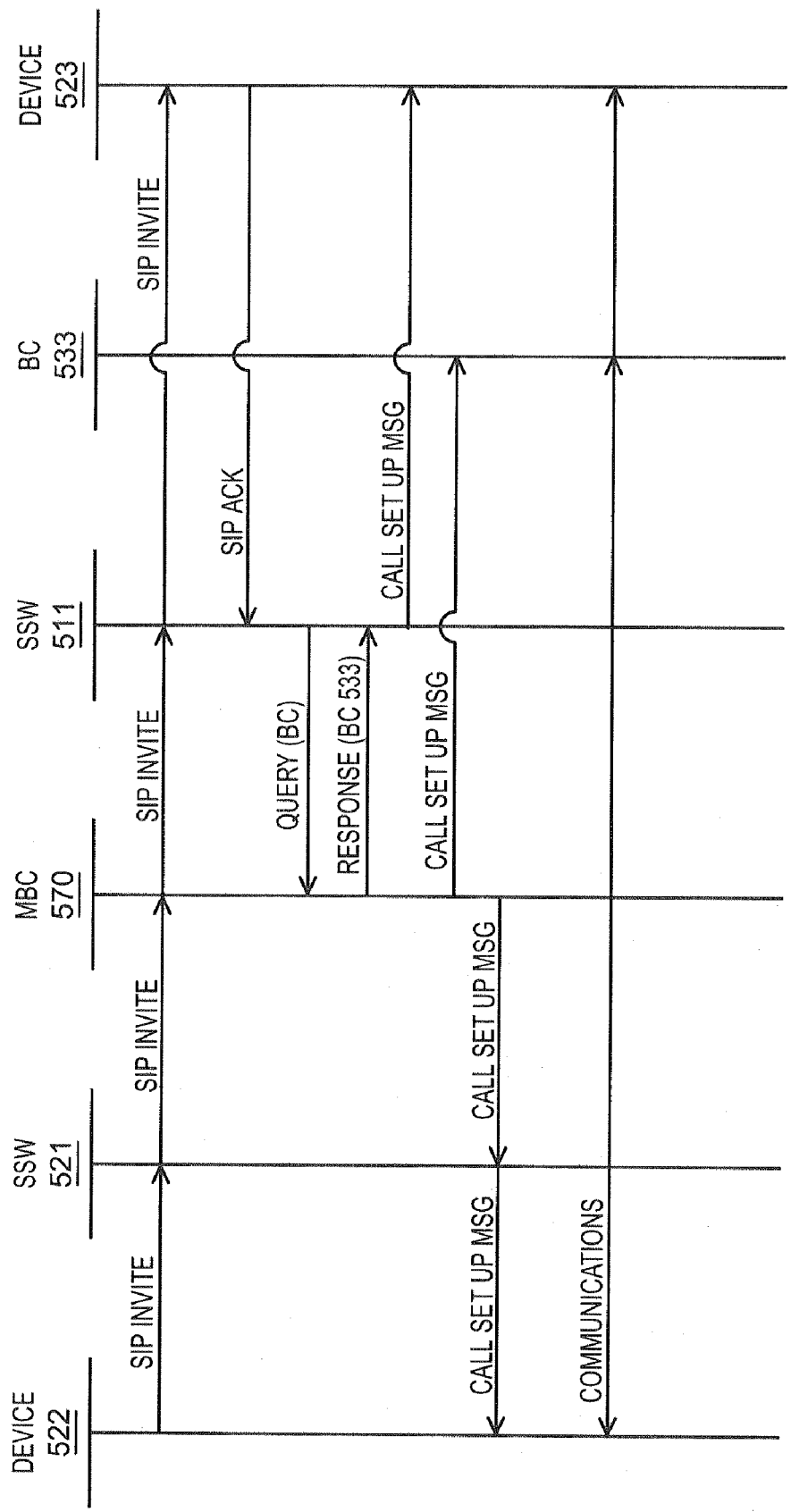
FIG. 6 illustrates the operation of a communication network in an embodiment.

FIG. 6 illustrates the operation of communication network 500 in an embodiment. In this illustration, a voice call is placed from SIP device 522 to SIP device 523. Devices 522 and 523 could comprise communication devices such as VoIP wireless phones, VoIP wireline phones, PDAs, as well as other communication devices. The call requires connecting the users of devices 522 and 523 across two competitive VoIP networks 510 and 520.

To begin, device 522 transfers a SIP invite message to soft switch 521. The SIP invite message indicates a proxy address for device 522. The proxy address is in the format user@domain.com. For example, the proxy address could identify the name of the user along with the domain the user belongs to, such as, john.smith@acme.com. The SIP invite message also indicates a proxy address for the user of device 523 in a similar format, such as, sally.jones@corporation.com. Prior to transmitting the SIP invite message, device 522 registered with VoIP network 520 by alerting switch 521 of its presence in the network. In response, switch 521 assigned device 522 a network address. The network address could be in the form of an IP address. Switch 521 therefore stores the network address (IP address) of device 522 in association with the proxy address cohn.smith@acme.com) of device 522.

Switch 521 recognizes from the SIP invite message that the destination for the requested call from device 522 is outside of VoIP network 520. Rather than automatically dump the call to PSTN region 552 through gateway 543, as done in the prior art, switch 521 forwards the SIP invite message to master border controller 570. Had switch 521 dumped the call to PSTN region 552 as is done in the prior art, the call could be routed through the PSTN to PSTN region 550. Gateway 541 would have then interworked the call to VoIP network 510, and ultimately to device 523.

Master border controller 570 processes the proxy address for user device 523 and determines that VoIP network 510 is the destination network for the call. Master border controller 570 then transfers the SIP invite message to soft switch 511. Device 523 had registered with VoIP network 510 by alerting switch 511 of its presence in the network. In response, switch 511 assigned device 523 a network address. The network address could be in the form of an IP address. Switch 511 therefore stores the network address (IP address) of device 523 in association with the proxy address (sally.jones@company.com) of device 523. Switch 511 is in communication with device 523 and knows that device 523 is available for a call by an acknowledgement message from device 523.

Switch 511 holds the network address of device 523. To setup the call, switch 511 needs to provide an address for a border controller to device 523. Switch 511 queries master border controller 570 for an available border controller for the call. The query indicates the proxy address for device 523 (sally.jones@company.com). Master border controller 570 receives the query and processes the query to determine a border controller for the call. The query does not indicate the proxy origination address for the call because switch 511 does not have knowledge of the call origination point. Rather, switch 511 only knows that device 523 is the destination point for the call. However, master border controller 570 previously received the SIP invite message from soft switch 521. The SIP invite message indicated the proxy origination address and the proxy destination address for the call. Therefore, master border controller 570 can work backwards using the query from switch 511 to determine the origination point for the call. Upon determining the origination network and the destination network for the call, master border controller determines the best border controller for the call.

FIG. 7 illustrates routing table 710 in an embodiment accessed by master border controller 570 to determine the best border controller for the call. Preferably, routing table 710 is a TRIP routing table. Routing table 710 includes rows and columns. The first column indicates a border controller. The second and third columns indicate the two networks between which the border controller of the first column is positioned. The fourth column indicates the status of the border controller of the first column. FIG. 7 only depicts four columns. However, additional columns and rows are possible indicating other data utilized for making routing decisions. Routing table 710 is not limited to the rows, columns, and data shown.

Routing table 710, in the first column, indicates border controllers 531, 532, 533, 581, 582, and 583. As depicted, border controllers 531, 532, and 533 are positioned between VoIP network 510 and VoIP network 520. Border controllers 581, 582, and 583 are positioned between VoIP network 510 and VoIP network 580. The status of each border controller is indicated in the fourth column by a one (1) or a zero (0). A one indicates that the border controller is active and available. A zero indicates that the border controller is otherwise inactive and not available. As indicated, gateways 531, 533, 581, and 582 are active and available. Border controllers 532 and 583 are inactive and unavailable. The fourth column could indicate other status indications such as capacity, transport type availability, health metrics, accounting metrics, as well as several other status indications.

Figure 8:
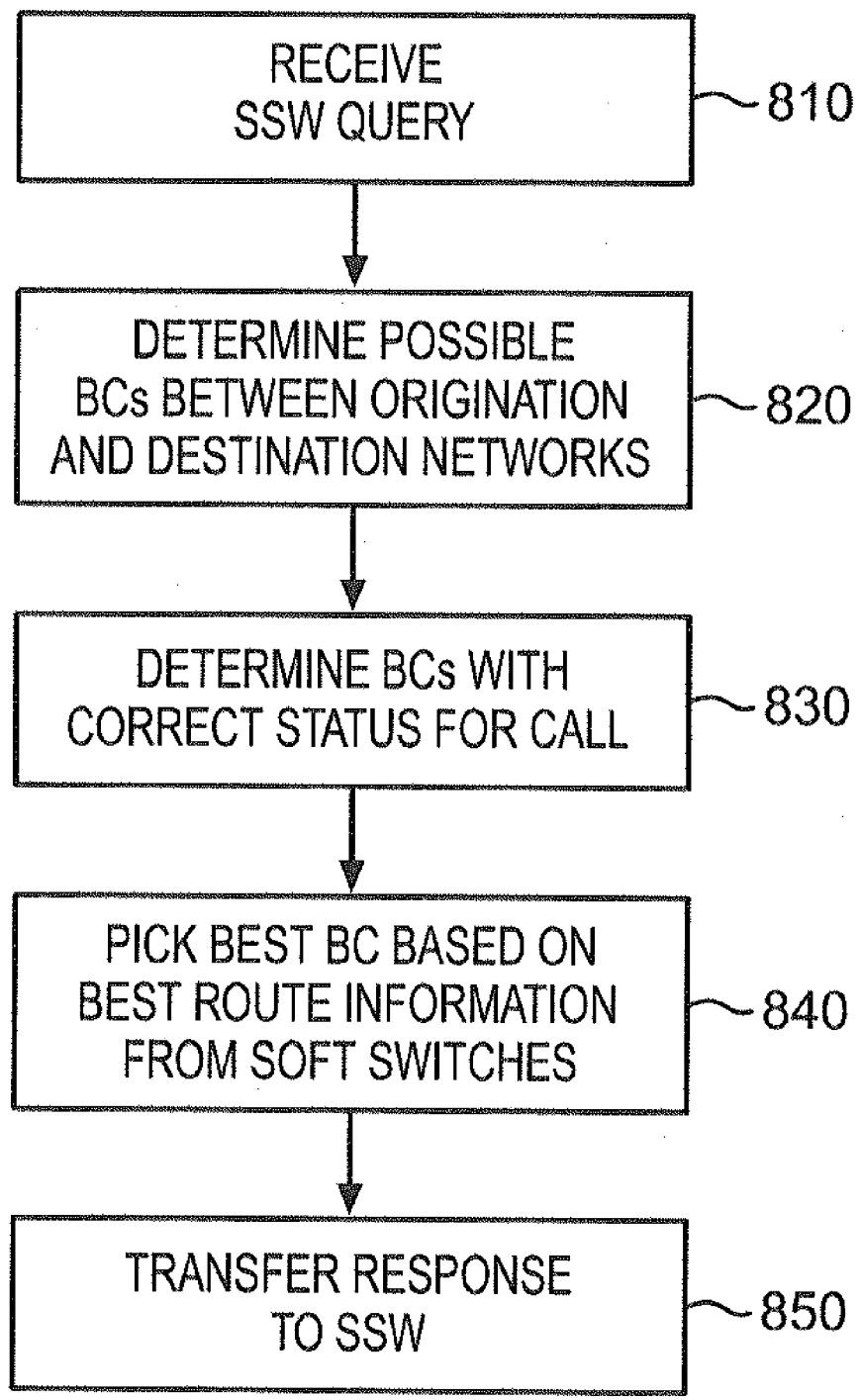
FIG. 8 illustrates the operation of a communication network in an embodiment.

FIG. 8 illustrates the operation of master border controller 570 in an embodiment. Master border controller 570 has received the query from soft switch 511 (Step 810). Master border controller 570 matched the query from soft switch 511 with the SIP invite message received earlier from switch 521. Thus, master border controller 570 has determined that VoIP network 520 is the origination network for the call and VoIP network 510 is the destination network for the call. Master border controller next determines from routing table 710 all the possible border controllers for the call between VoIP networks 510 and 520 (Step 820). The possible border controllers are border controllers 531, 532, and 533.

Next, master border controller uses routing table 710 to determine all the border controllers of border controllers 531, 532, and 533 that have the correct potential status for the call (Step 830). In this example, border controllers 531 and 533 are active and available. Border controller 532 is inactive and unavailable. Master border controller 570 then picks the best border controller of border controllers 531 and 533 based on best route information from soft switch 511 and 521 (Step 840). Lastly, master border controller 570 transfers a response to soft switch 511 indicating the chosen border controller and an address for the border controller. In this example, it is assumed that master border controller 570 picked border controller 533.

Returning to FIG. 6, soft switch 511 receives the response from master border controller 570. Switch 511 transfers a call setup message to device 523. The call setup message indicates the network address for border controller 533. Master border controller 570 transfers a call setup message to border controller 533. This call setup message indicates the network address for destination device 523 and the network address for origination device 522. Master border controller 570 also transfers a call setup message to soft switch 521. This call setup message indicates the network address of border controller 533 for the call. Soft switch 521 processes the call setup message and passes the network address of border controller 533 to device 522.

After call setup is complete, device 523 exchanges communications with device 522. In the example of a voice call, voice communications are packaged into voice packets. The packets are transmitted across VoIP networks 520 and 510. A typical packet includes header information and a payload. The header indicates an origin and a destination.

Packets traveling in the direction from device 522 to device 523 leave device 522 with an origination address indicating device 522 and a destination address indicating border controller 533. For instance, the origin could be the proxy address or network address of device 522. The destination could be the network address of border controller 533. At border controller 533, the header is changed to indicate a new destination and a new origin. The new addresses now indicate border controller 533 as the origin, and device 523 as the destination. The proxy address or network address of device 523 could be used to indicate the destination.

Packets traveling in the direction from device 523 to device 522 leave device 523 with an origin indicating device 523 and a destination indicating border controller 533. For instance, the origin could be the proxy address or network address of device 523. The destination could be the network address of border controller 533. At border controller 533, the header is changed to indicate a new destination and a new origin. The new addresses now indicate border controller 533 as the origin, and device 523 as the destination. The proxy address or network address of device 523 could be used to indicate the destination. The network address of border controller 533 could be used to indicate the origin.

Figure 9:
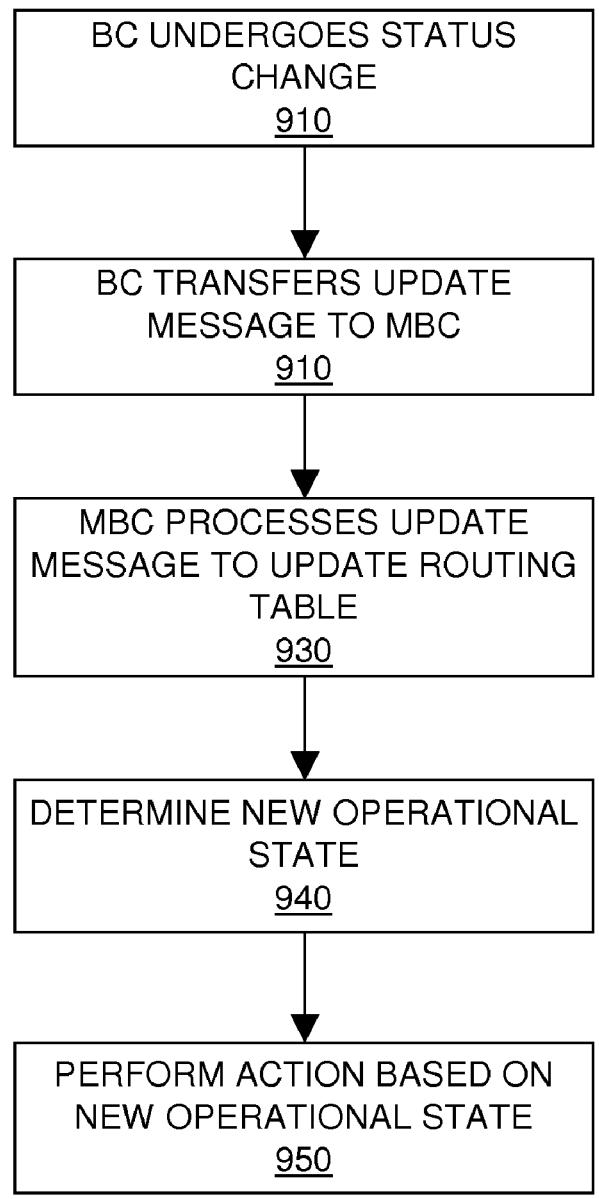
FIG. 9 illustrates the operation of a communication network in an embodiment.

FIG. 9 illustrates the operation of communication network 500 in an embodiment. Border controller 531 (or, optionally, border controllers 532 or 533) undergoes a status change (Step 910). The status change could be, for example, entering a period of congestion, reducing bandwidth or capacity, increasing bandwidth of capacity, failure of a route or node connected to border controller 531, as well as other status changes. In response to the status change, border controller 531 transfers an update message to master border controller 570 (Step 920). The update message could be a TRIP update message. The update message indicates the status change and the border controller.

Master border controller 570 receives the update message and processes the update message to update a routing table (Step 930). The routing table holds operational state information in association with border controllers 531, 532, and 533. Master border controller 570 determines a new operational state of border controller 531 based on the nature of the status change (Step 940). Upon determining the new operational state, master border controller 570 takes an action based on the new operational state (Step 950). For example, the new operational state could indicate that border controller 531 has failed, is congested, has increased or decreased capacity or bandwidth, has access to new routes, or has a route that has failed, as well as other indications. The action taken by master border controller 570 depends on several factors. For example, if border controller 531 fails, master border controller 570 will alert switches 511 and 521 of the failure. Similarly, if border controller 581 were to fail, master border controller would notify switches 591 and 511.

In an embodiment, master border controller 570 is able to perform correlation functions to prevent denial of service (DOS) attacks on a particular VoIP network. For example, master border controller 570 receives SIP invite messages for calls. Such call requests are processed and setup as describe above. Master border controller 570 stores the identity of the call participants identified in the SIP invite message. By logging the identity of call participants and comparing those identities to incoming packets, master border controller 570 can prevent unwanted DOS attacks.

In another example of correlation functions performed by master border controller 570, border controllers 531, 532, and 533 transmit correlation information to master border controller 570 regarding unsolicited communications received by border controllers 531, 532, 533. For instance, if border controller 531 senses a DOS attack, it can alert master border controller 570 of the attack and include details related to the attack such as the type of packets sent, the source of the packets, as well as other details. Master border controller 570 can log the attack information and transmit warnings to other border controllers regarding the attacks. The master border controller 570 can shift traffic away from the border controller under attack, thereby mitigating damage to any particular network.

Advantageously, border controllers transfer update messages to master border controller 570 rather than to soft switches 511, 521, and 591. Such an arrangement removes the burden of tracking the operational states of border controllers from soft switches and places the burden on master border controller 570. Further advantageously, master border controller 570 can perform load balancing operations across border controllers and monitor border controllers for maintenance reasons.

In other advantages of the invention, master border controller 570 determines the best border controller for the call, rather than burdening switch 511 with the responsibility of choosing the best border controller. Additionally, master border controller 570 informs switch 521 of the chosen border controller which removes security liabilities present if switch 511 were to pick the border controller and transmit a call setup message to switch 521. Thus, both packet networks 510 and 520 can protect their networks from unauthorized access. Segregating network operations is desirable because packet networks 510 and 520 are competitive networks. Furthermore, master border controller 570 has distributed knowledge of both voice packet networks 510 and 520, thereby enabling master border controller 570 to choose the optimal border controller for the call.

Figure 10:
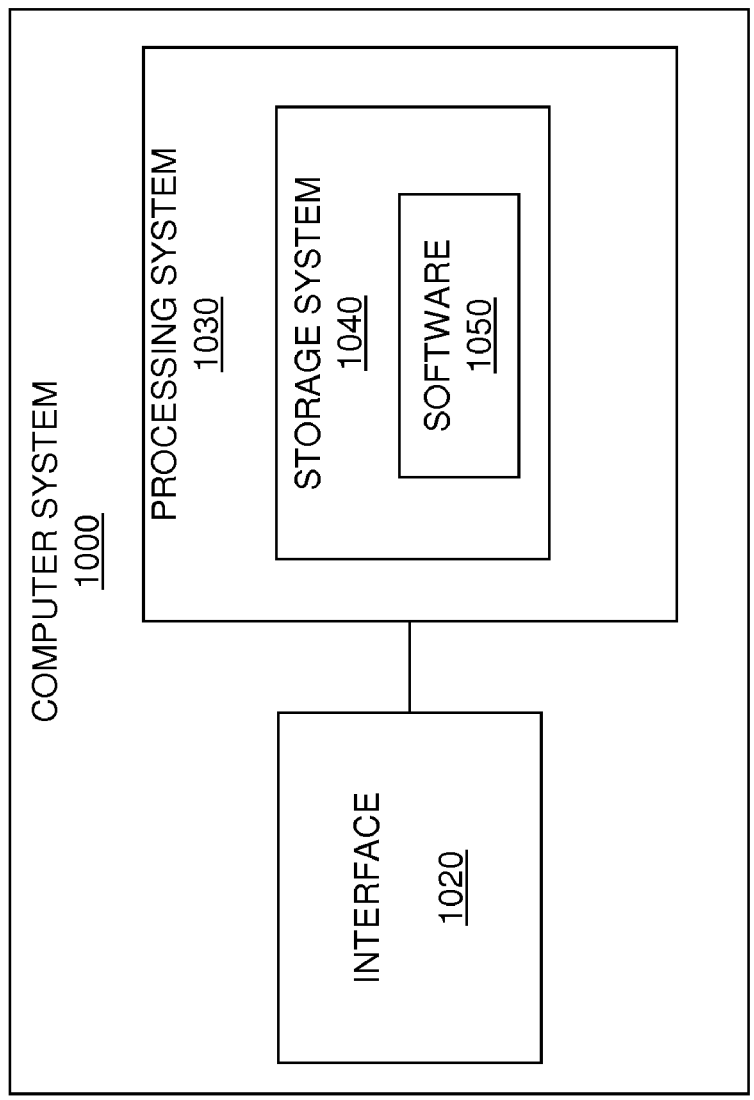
FIG. 10 illustrates a computer system in an embodiment.

FIG. 10 illustrates computer system 1000 in an embodiment. Computer system 1000 includes interface 1020, processing system 1030, storage system 1040, and software 1050. Storage system 1040 stores software 1050. Processing system 1030 is linked to interface 1020. Computer system 1000 could be comprised of a programmed general-purpose computer, although those skilled in the art will appreciate that programmable or special purpose circuitry and equipment may be used. Computer system 1000 may use a client server architecture where operations are distributed among a server system and client devices that together comprise elements 1020-1050.

Interface 1020 could comprise a network interface card, modem, port, or some other communication device. Interface 1020 may be distributed among multiple communication devices. Processing system 1030 could comprise a computer microprocessor, logic circuit, or some other processing device. Processing system 1030 may be distributed among multiple processing devices. Storage system 1040 could comprise a disk, tape, integrated circuit, server, or some other memory device. Storage system 1040 may be distributed among multiple memory devices.

Processing system 1030 retrieves and executes software 1050 from storage system 1040. Software 1050 may comprise an operating system, utilities, drivers, networking software, and other software typically loaded onto a general-purpose computer. Software 1050 could also comprise an application program, firmware, or some other form of machine-readable processing instructions. When executed by the processing system 1030, software 1050 directs processing system 1030 to operate as described for elements of communication networks 300 and 500.

What is claimed is:

1. A method of operating a communication network, the method comprising:
  receiving a plurality of update messages from a plurality of border controllers that interface communications between a first packet network and a second packet network;
  processing the update messages to determine operational states of the plurality of border controllers;
  responsive to receiving a query from a soft switch in the first packet network for a session between the first and second packet networks, processing the query to select a first border controller for the session from the plurality of border controllers based on the operational states of the plurality of border controllers; and,
  transferring a response to the soft switch indicating the first border controller.

2. The method of claim 1 wherein the first packet network comprises the soft switch and a destination element and wherein the second packet voice network comprises a second switch and an origination element.

3. The method of claim 2 wherein the soft switch is located within the first packet network, and wherein the query indicates a proxy origination address for an origination element and a proxy destination address for a destination element, and wherein the method further comprises transferring another query to another soft switch located in the second packet network in response to determining that the second packet network is associated with the proxy destination address.

4. The method of claim 3 further comprising transferring a session setup message to the first border controller indicating the proxy origination address and the proxy destination address for the session.

5. The method of claim 1 further comprising, responsive to determining the operational states of the plurality of border controllers, taking a one of the border controllers out of service based on the operational state of the one border controller.

6. The method of claim 1 further comprising, responsive to receiving the plurality of update messages from the plurality of border controllers, assigning a priority to each of the plurality of update messages based on the type of each of the plurality of update messages.

7. The method of claim 6 further comprising, in a processing system, responsive to entering a period of message congestion, dropping a group of the plurality of update messages based on the priority assigned to each of the plurality of update messages until the period of message congestion ends.

8. A method of operating a computer system, the method comprising:
  receiving a plurality of update messages from a plurality of border controllers that interface communications between a first packet network and a second packet network;
  processing the update messages to determine operational states of the plurality of border controllers;
  responsive to receiving a query from a soft switch in the first packet network for a session between the first and second packet networks, processing the query to select a first border controller for the session from the plurality of border controllers based on the operational states of the plurality of border controllers; and,
  transferring a response to the soft switch indicating the first border controller.

9. A communication system comprising:
- an interface configured to receive a plurality of update messages from a plurality of border controllers that interface communications between a first packet network and a second packet network; and
- a processing system coupled to the interface and configured to process the update messages to determine operational states of the plurality of border controllers, responsive to a query from a soft switch in the first packet network for a session between the first and second packet networks, process the query to select a first border controller for the session from the plurality of border controllers based on the operational states of the plurality of border controllers, and generate a response indicating the first border controller;
- the interface further configured to transfer the response to the soft switch.

10. The communication system of claim 9 wherein the first packet network comprises the soft switch and a destination element and wherein the second packet voice network comprises a second switch and an origination element.

11. The communication system of claim 10 wherein the soft switch is located within the first packet network, and wherein the query indicates a proxy origination address for an origination element and a proxy destination address for a destination element, and wherein the processing system is further configured to generate another query for delivery to another soft switch located in the second packet network in response to determining that the second packet network is associated with the proxy destination address, and wherein the interface is further configured to transfer the other query.

12. The communication system of claim 11 wherein the processing system is further configured to generate a session setup message indicating the proxy origination address and the proxy destination address for the session, and wherein the interface is further configured to transfer the session setup message for delivery to the first border controller.

13. The communication system of claim 9 wherein the processing system is further configured to, responsive to receiving the plurality of update messages via the interface from the plurality of border controllers, assigning a priority to each of the plurality of update messages based on the type of each of the plurality of update messages.

14. The communication system of claim 13 wherein the processing system is further configured to, responsive to entering a period of message congestion, drop a group of the plurality of update messages based on the priority assigned to each of the plurality of update messages until the period of message congestion ends.

* * * * *